I. C. PRATT.
Bee Hive.
No. 30,984. Patented Dec. 18, 1860.
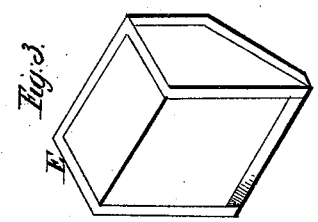
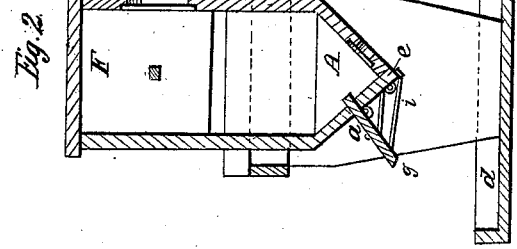
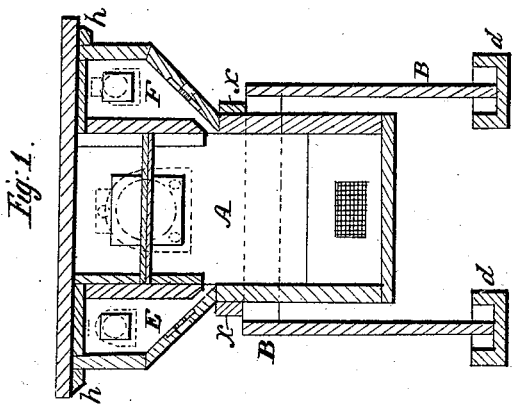

UNITED STATES PATENT OFFICE.

IRA C. PRATT, OF MORTON, ILLINOIS, ASSIGNOR TO HIMSELF AND THOMAS PARKER.

BEEHIVE.

Specification of Letters Patent No. 30,984, dated December 18, 1860.

*To all whom it may concern:*

Be it known that I, IRA C. PRATT, of Morton, in the county of Tazewell and State of Illinois, have invented certain new and useful Improvements in Beehives, of which the following is a full, clear, and exact description, reference being had to the accompanying drawings and the letters of reference thereon, in which—

Figure 1 is a longitudinal sectional view, Fig. 2 an end view, and Fig. 3 a perspective view of the sliding or adjustable box.

The nature of my invention consists in the employment of two sliding or adjustable boxes—in combination with the main hive; also the same in combination with a frame—which shall be provided with troughs substantially as and for the purpose hereinafter named.

To enable others skilled in the art to make and use my invention I will now proceed to describe its construction and operation.

Similar letters of reference indicate corresponding parts.

(A) represents the main hive—which consists of an oblong box, with its bottom converging equally upon both sides—thus resembling the letter V there is a small space left between the slanting sides which space is closed by the hinged piece (*l*) as seen in Fig. 2. The top of the hive should project—considerably over its sides for a purpose—which will be hereafter more fully seen. The sides of the lower half of the hive should include the remaining sides while the upper half should be included by them as fully shown in Fig. 1 between the divisions thus formed is an aperture sufficiently large to admit of the bees, going in and out. The main hive (A) should be provided with cross pieces on the inside. (*a*) is an aperture in the bottom of the hive for the exit and entrance of the bees—(*g*) is a lighting board which is hinged, so that the aperture may be closed when desired.

(*i*) is a hook by means of which said board (*g*) may be fastened down.

(B) represents a frame—the legs of which stand in the trough (*d d*). Said troughs should be kept filled with water, thus affording an insuperable barrier against insects crawling up the sides of the hive. (E, F) represent two sliding or adjustable boxes—the bottom of each box should be slanted or inclined toward the main hive, and provided with an aperture—corresponding with those in the hive—thus permitting the bees to enter the boxes and there deposit their honey—when the main hive is filled. These boxes can readily be taken out and the honey extracted. (*h h*) are two strips secured on the under side of the top of the hive, between which and the sides of the hives the boxes (E and F) slide, (X X) are two cross pieces nailed to the hive and which rest upon the frame (B).

The object in having the bottom of the hive and boxes slanting is to prevent the accumulation of dirt—thus the hive is kept constantly clean which is an essential requisite to the growth of bees. The main hive and boxes may be provided with windows as represented in the drawings.

Having thus fully described my invention what I claim and desire to secure by Letters Patent is—

The main hive (A) frame (B) and sliding boxes (E and F), when combined in the manner and for the purpose herein set forth and described.

IRA C. PRATT.

Witnesses:
JAS. M. CAMPBELL,
FRANK GRIESSER.